United States Patent
Schanz et al.

(10) Patent No.: US 7,804,557 B2
(45) Date of Patent: Sep. 28, 2010

(54) TRIGGER MECHANISM FOR FLUORESCENT TUBES

(75) Inventors: Christian Schanz, Neuburg (DE); Matthias Rupprecht, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 951 days.

(21) Appl. No.: 10/526,233

(22) PCT Filed: Aug. 27, 2003
(Under 37 CFR 1.47)

(86) PCT No.: PCT/EP03/09481

§ 371 (c)(1),
(2), (4) Date: Nov. 9, 2006

(87) PCT Pub. No.: WO2004/026006

PCT Pub. Date: Mar. 25, 2004

(65) Prior Publication Data

US 2009/0219464 A1 Sep. 3, 2009

(30) Foreign Application Priority Data

Aug. 28, 2002 (DE) .................................. 102 39 370

(51) Int. Cl.
*G02F 1/1335* (2006.01)
(52) U.S. Cl. ........................................ 349/70; 361/91.1
(58) Field of Classification Search ................ 361/91.1; 345/102, 207; 323/211, 299; 349/61, 65, 349/68, 70
See application file for complete search history.

(56) References Cited

U.S. PATENT DOCUMENTS

| | | | | |
|---|---|---|---|---|
| 4,220,895 A | * | 9/1980 | Nuver | 315/195 |
| 5,408,162 A | | 4/1995 | Williams | 315/224 |
| 5,420,481 A | * | 5/1995 | McCanney | 315/291 |
| 5,982,090 A | * | 11/1999 | Kalmanash | 313/493 |
| 6,104,146 A | | 8/2000 | Chou et al. | 315/277 |
| 6,351,074 B1 | * | 2/2002 | Ito et al. | 315/82 |
| 2001/0038425 A1 | * | 11/2001 | Lee | 349/61 |
| 2007/0052664 A1 | * | 3/2007 | Hirakata et al. | 345/102 |

OTHER PUBLICATIONS

Datasheet: "LT1768-High Power CCFL Controller for Wide Dimming Range and Maximum Lamp Lifetime" Linear Technology Corporation, 2000, pp. 1-20.
Linear Technology: Design Note No. 264; "High Power Desktop LCD Backlight Controller Supports Wide Dimming Ratios While Maximizing Lamp Lifetime," Aug. 2001.

* cited by examiner

*Primary Examiner*—Akm E Ullah
(74) *Attorney, Agent, or Firm*—O'Shea Getz P.C.

(57) ABSTRACT

The invention relates to a control system for at least two light tubes connected to a common transformer circuit. The control system comprises a control circuit which is provided with at least two detection inlets (a2, a3) used for detecting lamp currents (I1, I2) passing through the first and second light tubes, respectively. The detected lamp currents (I1, I2) can be regulated to a day mode with a high current intensity, and in a night mode with a low current intensity by the control circuit. The lamp currents (I1, I2) can be detected individually in day mode and in a common manner in night mode. The control system reduces instability of the tubes, in particular flicker.

10 Claims, 1 Drawing Sheet

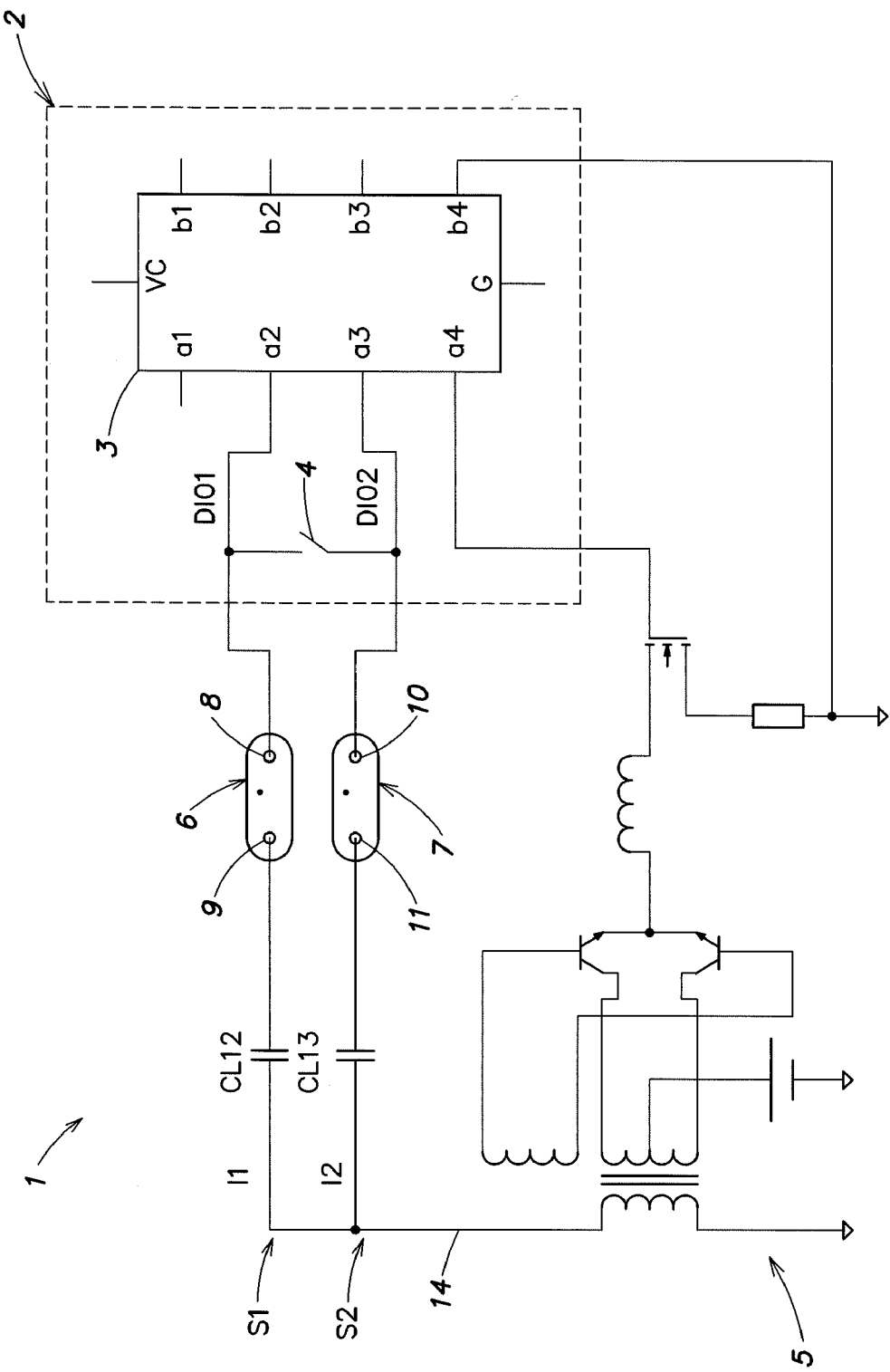

TRIGGER MECHANISM FOR FLUORESCENT TUBES

1. CLAIM OF PRIORITY

This patent application claims priority from PCT application PCT/EP2003/009481 filed Aug. 27, 2003, which claims the benefit of German patent application DE 102 39 370.2 filed Aug. 28, 2002.

2. FIELD OF THE INVENTION

The invention relates to the field of control systems for fluorescent tubes, and in particular to a control system that monitors and controls the lamp currents for at least two fluorescent lamps using a day control mode and a night control mode.

3. RELATED ART

Displays of multimedia systems are often illuminated by fluorescent tubes. Several parallel arranged tubes may be used for illumination, especially for higher light output when an individual fluorescent tube has insufficient light output. An electronic trigger is required to operate the fluorescent tubes. For cost reasons, two fluorescent tubes may be hooked up in parallel to a trigger and operated with a single transformer circuit.

As known, due to tolerances in the characteristics of the fluorescent tubes, faults can occur. In this case, the current dictated by the trigger is not distributed uniformly over the parallel-connected fluorescent tubes. The parallel fluorescent tubes each have a negative internal resistance, i.e., the maximum ignition voltage occurs at minimum lamp current. Thus, a parallel arrangement of the tubes results in an unstable system, since the current may flow entirely through the fluorescent tube with low resistance and leave the other fluorescent tube without current. By using series-connected ballast resistances or impedances, the lamp currents can be kept symmetrical at sufficient current strengths, since the ballast resistances determine the voltage divider ratio and thus, in turn, the currents in the two branches. However, when the current strength is relatively low, the voltage drop across the ballast resistances is so low that the voltage divider is determined by the now relatively high lamp resistance. The circuit can become asymmetrical even in the presence of low stray capacitances, which can totally disable a lamp. Although the control circuit, such as a controller IC, can register this as a drop below a predetermined minimum current value and reduce the lamp current (e.g., in a fault mode or error mode) and again ignite the lamp in a following burst mode to ignite the lamp once again, if the low current strength through this lamp continues then this behavior may repeat itself and the lamp will flicker. Therefore, when the brightness is set low (i.e., a high dim rate) the display may flicker.

There is a need for a trigger circuit for parallel arranged fluorescent tubes that prevents an unstable behavior of the lamps, such as flickering.

SUMMARY OF THE INVENTION

The setting range or dim range of the lamp currents is divided into a brighter region (e.g., a day mode) and a darker region (e.g., night mode). Detection of the lamp currents is effected by a suitable control circuit, such as an integrated controller that receives a first lamp current signal and a second lamp current signal.

In the night mode, the lamp currents are evaluated jointly by the control circuit. The joint evaluation can occur by connecting the two detection inputs via a switch. This has the result that when the behavior of the fluorescent tubes is asymmetrical, neither of the detection inputs recognizes a current that is so weak that it is reduced further. Therefore, the two tubes shine with constant, low brightness, and asymmetries due to the lower current strengths do not result in disruption of one of the fluorescent tubes. In the day mode with higher current strengths, a separate evaluation and setting of the currents occur.

Other systems, methods, features and advantages of the invention will be, or will become, apparent to one with skill in the art upon examination of the following FIGURE and detailed description. It is intended that all such additional systems, methods, features and advantages be included within this description, be within the scope of the invention, and be protected by the following claims.

DESCRIPTION OF THE DRAWINGS

The invention can be better understood with reference to the following drawing and description. The components in the FIGURE are not necessarily to scale, emphasis instead being placed upon illustrating the principles of the invention. Moreover, in the FIGURE, like reference numerals designate corresponding parts throughout the different views.

The FIGURE is a schematic illustration of a control system for fluorescent light tubes.

DETAILED DESCRIPTION OF THE INVENTION

A lamp circuit 1 includes a trigger mechanism 2 with a control circuit 3 (e.g., a controller IC). Such a controller IC is available, for example, from Linear Technology under the model name LT1768. The trigger mechanism 2 includes a switch 4 that is connected between signal lines DIO1 and DIO2. The switch 4 can be designed for example as a semiconductor switch, and the switch is opened in a day mode and closed in a night mode.

The lamp circuit 1 also includes a transformer circuit 5 that provides a current signal on a common connection line 14. The current signal is split to provide a first current signal I1 along a first current path S1 and a second current signal I2 along a second current path S2. The first current signal I1 along the first current path S1 is input to a first fluorescent tube 6 via a first ballast capacitor CL12, and the second current signal I2 along the second current path S2 is input to a second fluorescent tube 7 via a second ballast capacitor CL13.

Connection contacts 8 and 10 for the fluorescent tubes 6, 7 are connected to the control circuit 3 via inputs DIO1, DIO2, respectively. The other connection contacts 9 and 11 of the fluorescent tubes 6 and 7 are connected to their associated ballast capacitors CL12 and CL13, so the two parallel and symmetrical current paths S1 and S2 are formed.

The control circuit 3 detects the lamp currents arriving via the detection inputs a2 and a3 and adjusts suitable lamp currents. In the day mode with higher current strengths, the switch 4 is in the open position, and the lamp currents I1, I2 each flow to the corresponding input a2 and a3, so that they can be detected and adjusted separately. In the night mode with lower current strengths and the switch 4 positioned in the closed position, the lamp currents I1, I2 of both inputs a2, a3 can be detected. The voltage dropping across the current paths S1 and S2 drops essentially across the fluorescent tubes 6 and 7 when the current strengths are low (e.g., during the night operating mode). If more asymmetrical behavior occurs (e.g., so that a smaller current I1 flows through the tube 6 in comparison to the tube 7), since the switch 4 is in the closed position, the control circuit inputs a2, as well as a3, will still take up both currents I1 and I2 or a portion of the sum of both currents. Since the switch 4 is in the closed position, failure of the tube 6 is not recognized at the control circuit input a2 since the input also sees the second current signal. Advantageously, subsequent re-ignition of the tube 6 in a burst cycle is prevented. Therefore, in the night mode, a periodic reducing and reactivation of the current of the less-bright tube is prevented and uniform lighting—asymmetrical if desired—is achieved.

The illustration has been discussed with reference to functional blocks identified as modules and components that are not intended to represent discrete structures and may be combined or further sub-divided. In addition, while an embodiment of the invention has been described, it will be apparent to those of ordinary skill in the art that other embodiments and implementations are possible that are within the scope of this invention. Accordingly, the invention is not restricted except in light of the attached claims and their equivalents.

What is claimed is:

1. A trigger mechanism for at least two fluorescent tubes connected to a common transformer circuit, comprising:
   a backlight control circuit that receives a first current signal representative of the current flowing through a first fluorescent tube, and a second current signal representative of the current flowing through a second fluorescent tube;
   a switch that is configured and arranged to selectively shunt the outputs of the first and second tubes, where when the switch is in a first position the first and second current signals are shunted together and can be detected by the backlight control circuit jointly, and when the switch is in a second position the first and second current signals are not shunted together and the first and second current signal are detected by the backlight control circuit separately from each other.

2. The trigger mechanism of claim 1, where the backlight control circuit upon detecting a drop below a minimum current value, reduces the lamp current and initiates a burst mode to produce an ignition.

3. The trigger mechanism of claim 1, where the control circuit is located within an integrated circuit that provides a PWM output signal to a MOSFET that provides, via a common transformer circuit, a lamp current signal that is split to provide the first and second current signals.

4. A fluorescent tube driver circuit, comprising:
   a transformer network that provides a lamp current signal that is split to a first current signal and a second current signal;
   a first current path that receives the first current signal, and includes a first ballast serially connected to a high voltage side of a first fluorescent tube;
   a second current path that receives the second current signal and is electrically parallel to the first current path, and includes a second ballast serially connected to a high voltage side of a second fluorescent tube;
   a switch that in a first position shunts the first and second current signals at a low voltage side of the first and second fluorescent tubes;
   a backlight controller trigger mechanism, which includes a control circuit that receives the first current signal and the second current signal.

5. The fluorescent tube drive circuit of claim 4, where the switch comprises a semiconductor switch.

6. The fluorescent tube drive circuit of claim 4, where the control circuit comprises a dual cold cathode fluorescent lamp backlight inverter integrated circuit.

7. The fluorescent tube drive circuit of claim 5, where the control circuit comprises a LT1768 integrated circuit.

8. A liquid crystal display backlight control circuit, comprising:
   a transformer network that provides a lamp current signal that is split to a first current signal and a second current signal;
   a first current path that receives the first current signal, and includes a first ballast serially connected to a high voltage side of a first fluorescent lamp;
   a second current path that receives the second current signal and is electrically parallel to the first current path, and includes a second ballast serially connected to a high voltage side of a second fluorescent lamp;
   double pole single throw semiconductor switch that in a first position shunts the first and second current signals at a low voltage side of the first and second fluorescent tubes; and
   a backlight controller trigger mechanism that receives each of the first and second current signals and sets the value of the lamp current signal.

9. The liquid crystal display backlight control circuit of claim 8, where the control circuit comprises a dual cold cathode fluorescent lamp backlight inverter integrated circuit.

10. The liquid crystal display backlight control circuit of claim 9, where the control circuit comprises a LT1768 integrated circuit.

* * * * *

UNITED STATES PATENT AND TRADEMARK OFFICE
CERTIFICATE OF CORRECTION

PATENT NO. : 7,804,557 B2
APPLICATION NO. : 10/526233
DATED : September 28, 2010
INVENTOR(S) : Schanz et al.

It is certified that error appears in the above-identified patent and that said Letters Patent is hereby corrected as shown below:

Column 4
Line 10, after "second current signal" insert --and sets the value of the lamp current signal--

Signed and Sealed this

Second Day of November, 2010

David J. Kappos
*Director of the United States Patent and Trademark Office*